Aug. 18, 1925.  
J. P. HOHMANN  
1,550,438  
POULTRY FEEDER AND EXERCISER  
Filed April 15, 1925
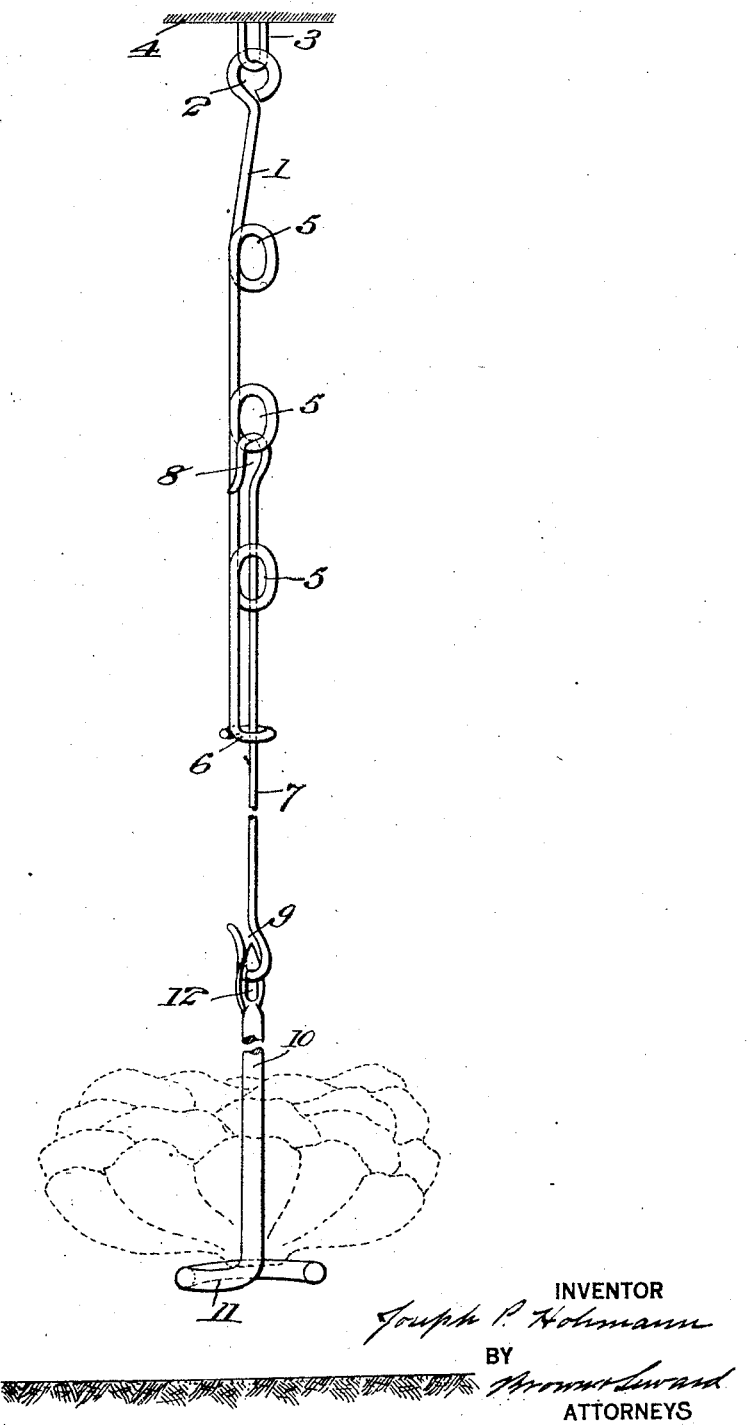
INVENTOR  
Joseph P. Hohmann  
BY  
ATTORNEYS Patented Aug. 18, 1925.

1,550,438

UNITED STATES PATENT OFFICE.

JOSEPH P. HOHMANN, OF FLEMINGTON, NEW JERSEY.

POULTRY FEEDER AND EXERCISER.

Application filed April 15, 1925. Serial No. 23,252.

*To all whom it may concern:*

Be it known that I, JOSEPH P. HOHMANN, a citizen of the United States, and resident of Flemington, in the county of Hunterdon and State of New Jersey, have invented a new and useful Improvement in Poultry Feeders and Exercisers, of which the following is a specification.

I have discovered that where poultry is closely housed, a device which will occupy attention of the poultry and which will give the poultry exercise, is greatly needed. This is especially true where young chickens are crowded together.

The object of my invention is to provide a poultry feeder and exerciser which will not only present the food to the poultry in a sanitary and attractive manner, but which will also give the poultry the needed exercise, thereby preventing to a large extent the prevalent "cannibalism" among young chickens, due to idleness and consequent "toe-picking."

My invention comprises a novel food carrying device which is so suspended as to bring the food within reach of the poultry, means being provided for adjusting the device to bring the food to the desired height above the ground or floor.

A practical embodiment of my invention is represented in the accompanying drawings, in which the poultry feeder and exerciser is represented in side elevation, suspended from an overhead support, as in use.

The device herein shown comprises upper, intermediate and lower members.

The first or upper member 1 is provided at its upper end with an eye 2, through which the staple 3 passes, which staple is used for fastening the member to the ceiling or overhead support 4. This member 1 is also provided with a plurality of loops 5 at different heights between its upper and lower ends. A guide eye 6 is also provided at the lower end of the upper member 1.

The second or intermediate member 7 of the device passes through the guide eye 6 of the upper member and is provided at its upper end with a hook 8 for removable engagement with one of the loops 5. The lower end of this second member is provided with a hook 9.

The third or lower member of the device comprises a food impaling element 10 and a food supporting element 11.

The upper end of the food impaling element 10 is provided with an eye 12 for removable engagement by the lower hook 9 of the intermediate member.

From the above description it will be seen that I have provided a device in which any suitable kind of poultry food may be impaled on and carried by the lower member and said food adjusted to the desired height above the floor or ground, by the intermediate member.

As the poultry peck at the food they will cause the device to swing to and fro, thereby furnishing the much needed exercise for the poultry, the food at the same time being kept above the floor in a sanitary condition, which is also very important, especially where green vegetables are carried by the device.

It is evident that various changes may be resorted to in the construction, form and arrangement of the several parts without departing from the spirit and scope of my invention; hence, I do not wish to be limited to the particular embodiment herein shown and described, but

What I claim is:—

1. A poultry feeder and exerciser, comprising a member adapted to be suspended from an overhead support, a second member adapted to be adjustably attached to the first named member, and a third food carrying member adapted to be removably attached to the second named member, said third member having a food impaling element.

2. A poultry feeder and exerciser, comprising a member adapted to be suspended from an overhead support and provided with a plurality of loops at different heights between its ends, a second member having a hook at its upper end for engaging one of said loops, and a hook at its lower end, and a third member having a food impaling element provided with an eye for removable engagement with the lower hook of the second named member.

3. A poultry feeder and exerciser, comprising a member adapted to be suspended from an overhead support and provided with a plurality of loops at different heights between its ends and a guide eye at its lower end, a second member passing through said guide eye and having a hook at its upper end for engaging one of said loops, and a hook at its lower end, and a third member having a food impaling element provided with an eye for removable engagement with the lower hook of the second named member.

In testimony, that I claim the foregoing as my invention, I have signed my name this fourteenth day of April, 1925.

JOSEPH P. HOHMANN.